United States Patent [19]

Zahedi et al.

[11] 4,144,359

[45] Mar. 13, 1979

[54] APPARATUS AND METHOD FOR CONTROLLING POLLUTANT EMISSIONS AND FOR ENHANCING THE MANUFACTURE OF ASPHALTIC ROOFING

[75] Inventors: Karim Zahedi, Brookline; Jeffery Alexander; Peter Zieve, both of Belmont, all of Mass.

[73] Assignee: EFB Inc., Cambridge, Mass.

[21] Appl. No.: 854,019

[22] Filed: Nov. 22, 1977

[51] Int. Cl.$^2$ .................... B05D 1/00; C23C 13/04
[52] U.S. Cl. .................................. 427/39; 55/131; 55/138; 55/427; 118/49.5; 118/61; 118/310; 427/186; 427/215; 427/255
[58] Field of Search ............... 427/13, 38, 39, 186, 427/187, 188, 180, 201, 212, 215, 248, 255; 118/49.5, 48.61, 620, 621, 308, 310; 55/98, 124, 136, 138, 131, 479

[56] References Cited

U.S. PATENT DOCUMENTS

| 3,926,587 | 12/1975 | Squires | 55/98 X |
| 3,982,043 | 9/1976 | Simpson | 55/131 X |

OTHER PUBLICATIONS

"Atmospheric Emissions from Asphalt Roofing Processes", Gerstle, R. W.; Pedco Environmental Inc., NTIS of ERDA-PB-238-445.

Primary Examiner—Morris Kaplan
Attorney, Agent, or Firm—Shapiro and Shapiro

[57] ABSTRACT

Pollutant emissions produced in the manufacture of asphaltic roofing are controlled by the use of electrified bed filters. Filter bed granules coated with pollutants are removed from the beds periodically and are used in the manufacture of the roofing. A prefilter is employed to remove varnishing pollutant components in the supermicron size range to prevent fouling of an electrical charger.

21 Claims, 7 Drawing Figures

APPARATUS AND METHOD FOR CONTROLLING POLLUTANT EMISSIONS AND FOR ENHANCING THE MANUFACTURE OF ASPHALTIC ROOFING

BACKGROUND OF THE INVENTION

This invention relates to the manufacture of products such as asphaltic roofing, in which granules or particles are applied to a substrate such as an asphalt-saturated fabric. The invention is particularly concerned with controlling pollutant emissions by efficient filtration, and with enhancement of the manufacturing process.

In the manufacture of asphaltic roofing, three major types of raw materials are used: (1) bitumens, (2) solid filler and coating materials, and (3) fabrics. Bitumens consist mainly of asphalt and tar. Fillers include mineral fillers such as sand and other fine oxides, silicates, carbonates, and sulfates; organic fillers such as vegetable starches, grain dust, coal and peat; inorganic fibers such as glass and asbestos; and organic fibers such as wood, rag, and paper. Fabrics include felted and woven fabrics. Felted fabrics (felt) are generally formed of paper, rag or asbestos fibers, with or without additions, while woven fabrics ordinarily include burlap or hessian, sheeting, and osnaburg and duck. The roofing may comprise single or multiple layers of a fabric (woven or felted) saturated and/or coated with bituminous compositions, and fillers such as mineral granules may be embedded in the saturated fabric, and/or mixed with bituminous material and coated on the fabric.

In the manufacture of asphalt shingles, for example, a fabric is saturated with asphalt in high speed continuous machines. Granules or particles such as oiled crushed slate (e.g., mesh size +10) are sprinkled onto or otherwise applied to the saturated felt, which may be again covered with asphalt and then further covered with colored crushed slate. Pre-oiling of the granules serves to enhance the adherence of the granules to the saturated felt. The production line may comprise a large roll of felt feeding a dry looper section that takes up surges in line speed, an asphalt saturator having a spray section and a dipping section, a drying section with heated rolls, coating and surfacing areas, a final cooling section consisting of both water sprays and water-cooled rolls, a finish looper area, and finally a shingle-cutter.

Saturation is accomplished by dipping the felt in asphalt, spraying it with asphalt, or both, the asphalt being maintained at a temperature of 400°–500° F. Before being supplied to the saturator, the hot asphalt is usually subjected to a blowing operation, in which air is blown through the asphalt in a blowing drum. The blown asphalt is then stored for use in the saturating and coating operations.

The manufacture of asphalt roofing generates two basic air pollutants: (1) gaseous and condensible hydrocarbons from the saturator, asphalt blower and hot asphalt storage, and (2) solid particulate matter from the application of mineral and other granular coating agents or fillers. In the saturation process, for example, a fine hydrocarbon smoke is formed by vaporization (and later condensation) of lighter-weight hydrocarbons from the hot asphalt, by agitation of the asphalt, and by the spraying of fine asphalt droplets. The entire saturator is normally enclosed by a hood in order to vent these fumes to a control device or directly to the atmosphere.

Hydrocarbon fumes, felt fibers, and stone dust from crushed slate or other granular materials are highly noxious emissions that must be controlled so that they are not breathed by factory workers or expelled to the atmosphere. At present, four types of apparatus are employed in attempting to clean the air in and around asphalt roofing plants: incinerators or afterburners, scrubbers, electrostatic precipitators, and high efficiency air filters such as those sold under the brand name *HEAF*.

Incinerators of afterburners are employed to burn hydrocarbon fumes, but operating costs for such apparatus have been prohibitively high due to rising fuel costs. Scrubbers are plagued by poor submicron particulate collection efficiency and create water pollution problems. Two-stage, low-voltage electrostatic precipitators can achieve initial efficiencies of 95%, but sticky asphaltic components of the fumes conbined with stone dust and felt fibers quicly "varnish" the metal collecting electrodes. Frequent, difficult cleaning is required. As a result, these systems are high in maintenance and low in reliability. High efficiency air filters employing fiber mats at very high static pressure drops achieve good submicron particulate collection efficiency, but operational costs and installation costs are very high because large, powerful fans are required. Furthermore, the fouled filter media create a problem of replacement and disposal.

BRIEF DESCRIPTION OF THE INVENTION

Accordingly, a principal object of the present invention is to provide an improved apparatus and method for controlling pollutant emissions produced in the manufacture of asphaltic roofing materials and the like, while simultaneously enhancing the production of such materials.

A further object of the invention is to provide an apparatus and method for the foregoing purposes and having better collection efficiency, lower capital and operating costs, better reliability and lower maintenance requirements than comparable apparatus and methods of the prior art.

Briefly stated, in one of its aspects, the present invention employs a filter having an electrified bed of granules of the type used in the manufacture of a product such as asphaltic roofing. A gas stream containing pollutants is passed through the filter bed after the pollutants have been electrically charged. The granules of the filter bed, which become coated with an oily pollutant substance, are later removed from the bed (which is replenished with new granules) and employed in the manufacture of the product, thereby entirely avoiding the problem of cleaning or disposal of the filter medium and simultaneously enhancing the manufacturing process. In another aspect of the invention, a prefilter having a bed of granules of the type employed in the manufacturing process removes varnishing pollutant components in the 1 to 5 micron size range, thereby preventing fouling of the electrical charger and at the same time providing additional coated granules for use in the manufacturing process.

BRIEF DESCRIPTION OF THE DRAWINGS

The invention will be furtherdescribed in conjunction with the accompanying drawings, which illustrate preferred and exemplary embodiments, and wherein.

DETAILED DESCRIPTION OF THE INVENTION

Figure 1:
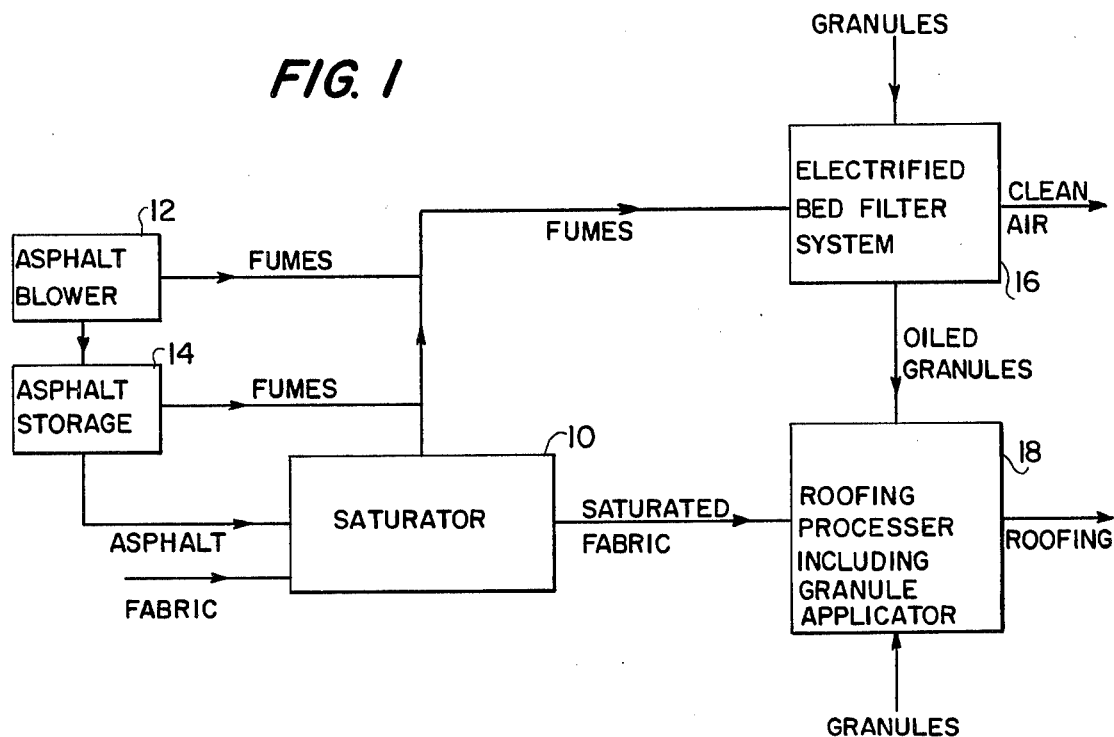
FIG. 1 is a block diagram illustrating a roofing manufacturing system employing the invention.

FIG. 1 illustrates the utilization of the invention in a system for manufacturing asphaltic roofing, such as asphalt shingles. As is well known, in the manufacture of asphalt shingles a fabric which may be woven or felted (felt) is saturated with hot asphalt in a saturator 10. The asphalt may first be subjected to a blowing operation in an asphalt blower 12, and the hot asphalt may be stored, as indicated at 14, before being supplied to saturator 10. Fumes including hydrocarbons and other pollutants must be controlled to prevent noxious and troublesome emissions. The principal fume source are the saturator 10, the asphalt blower 12, and the asphalt storage 14.

In accordance with the invention, a gas stream containing such fumes is supplied to a electrified bed filter system 16. The gas stream may be formed by blowing air through hoods shrouding the fume generators, for example. The filter system 16 includes one or more filter units having an electrified bed of granules or particles of the type employed in the roofing manufacturing process. For example, the granules or particles may comprise crushed slate (e.g., mesh +10), sand, or other suitable inorganic or organic granular substances of the type well known in the manufacture of asphaltic roofing materials — all referred to herein simply as "granules." As will be seen more fully herinafter, the filter bed granules become coated with oily pollutants, and the "oiled granules" are removed from the filter beds and supplied to a granule applicator forming part of the roofing processor 18 to which the saturated fabric from saturator 10 is supplied. New granules are supplied to the filter bed system 16, as indicated in FIG. 1, for replenishment of the filter medium. Granules are also supplied to the roofing processor 18 independently of the filter system 16, as indicated in FIG. 1. Block 18 is intended to represent not only the conventional granule applicator employed in coating or surfacing the saturated fabric, but is also intended to represent the associated cooling, drying, cutting and other apparatus employed in the manufacture of conventional roofing materials. Further details of systems for manufacturing asphaltic roofing (including a saturator, asphalt blower, asphalt storage, granule applicator, etc.) and information concerning pollutant emissions from asphalt roofing processes and prior art attempts to control such emissions may be found in a published report of the Office of Research and Development of the U.S. Environmental Protection Agency, identified as E.P.A. — 650/2-74-101, October 1974 — "Atmospheric Emissions From Asphalt Roofing Processes." This report is incorporated herein by reference.

It will be observed that the outputs of the system of FIG. 1 and (1) finished roofing (the desired product) and (2) clean air. There are no pollutants or used filter media to dispose of. This is a most important concept of the invention, which will now be explained in greater detail.

Figure 2:
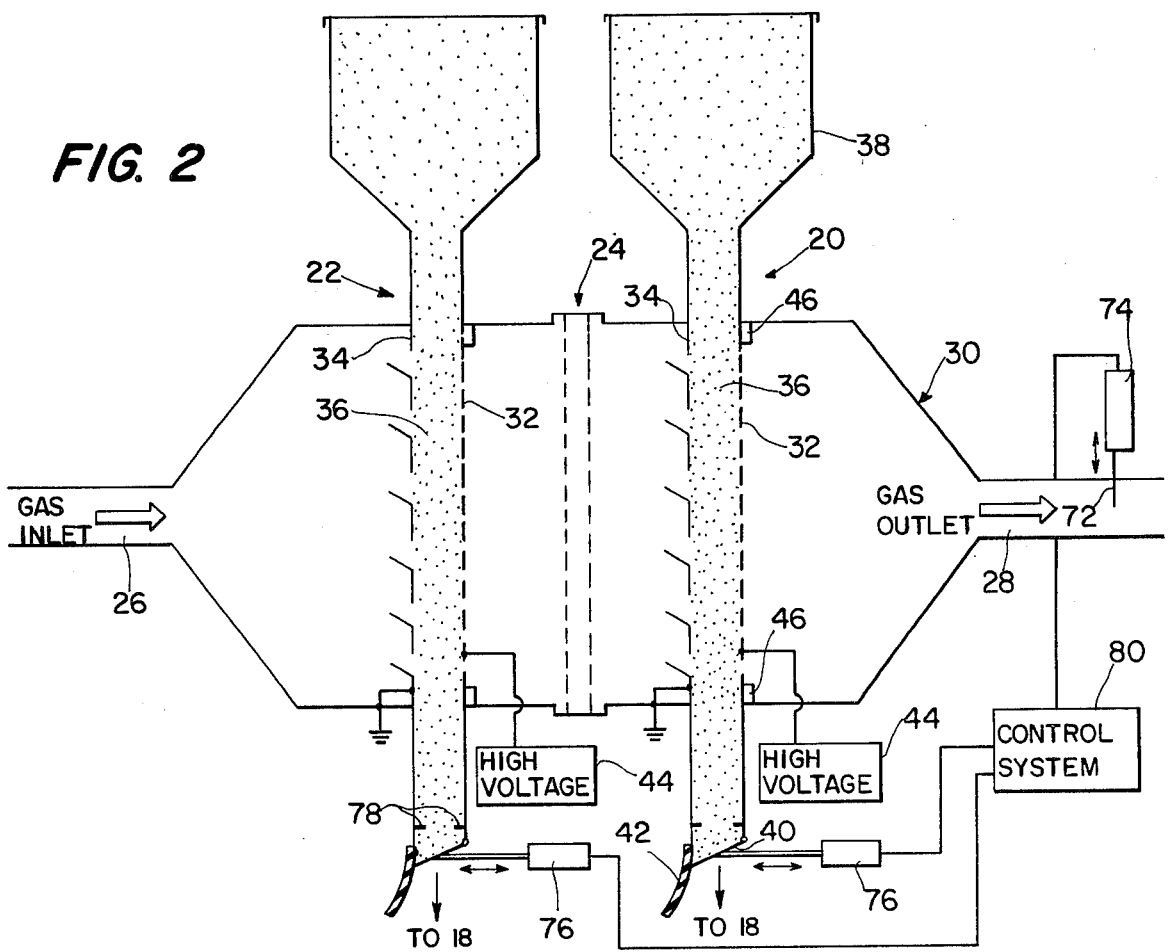
FIG. 2 is a further described longitudinal sectional view illustrating a basic filter unit in accordance with the invention.

As shown in FIG. 2, a basic filter unit of the invention, employed in filter system 16, preferably comprises a filter 20 (which may be considered as a main or final filter), a prefilter 22, and an electrical charger 24 interposed between filters 20 and 22. The filters are arranged so as to intersect a gas flow path between a gas inlet 26 and a gas outlet 28 of a conduit 30. It is apparent in the diagrammatic illustration that tapered transitions may be provided between the inlet and outlet sections and an enlarged intermediate conduit section (or a separate chamber or chambers) accommodating the filters. The usual flow-directing baffles may also be employed. A conventional blower or fan, referred to previously, may be employed. A conventional blower or fan, referred to previously, may be employed either at the inlet end or at the outlet end of conduit 30, to provide a gas stream through the conduit. The inlet gas stream contains the pollutants to be removed, of course.

Filter 20 comprises a pair of spaced electrode plates 32 and 34 between which the packed bed filter medium 36 is located. The filler medium is a bed of granules 36 (such as the crushed slate referred to previously) of the type employed in the roofing manufacturing process. The granules may be placed in a hopper 38 from which they are fed to the filter bed by gravity. At the bottom of the filter bed a door 40 is provided, the door being normally closed against a flexible stop 42 to retain the granules in the bed. A high voltage supply 44 (preferably DC, although AC may be used) is connected to electrode 32, and electrode 34 is connected to the wall of conduit 30, which is metal and grounded in the illustrative embodiment. Conventional insulators 46 insulate electrode 32 from the conduit.

Figure 3:
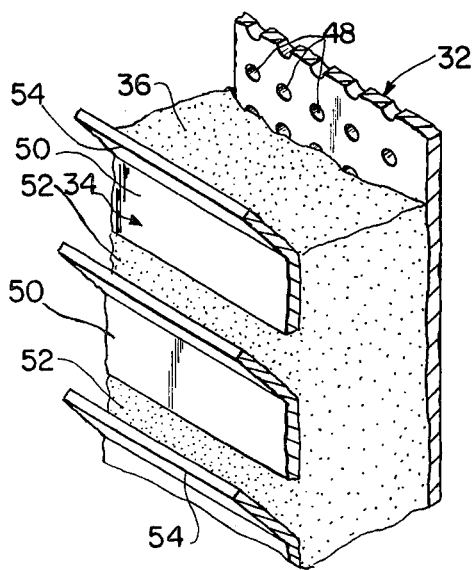
FIG. 3 is a fragmentary perspective view illustrating a filter panel section in accordance with the invention.

The electrode structure is shown in greater detail in FIG. 3. As shown, electrode plate 32 is perforated to provide openings 48 through the electrode for the passage of the gas stream. The perforations may be round holes of about 1/16" in diameter arranged regularly over the surface of the electrode, and the total open area may be 5–30% of the area of the electrode, for example.

Electrode 34 is preferably a louvered plate especially designed to eliminate the possibility of clogging or fouling by the asphaltic fumes and to provide nearly uniform electric fields inside the bed — resulting in greater collection efficiency. The long vertical flat sections 50 serve to provide uniform electric fields in the bed. The long slot openings 52 between sections 50 are large enough so that no clogging or fouling can occur. The angled louvers 54 extend outwardly and upwardly far enough to prevent granules from falling out of the bed, and their length away from flat sections 50 is dictated by the angle of repose of the granules. The overall bed thickness or depth (the distance between the electrodes 32 and 34 in FIGS. 2 and 3) is optimized at from about 1 to about 3 inches. Deeper beds provide greater collection efficiency but also require greater gas pressure drop and thus larger fan power. The optimum bed depth range is also dictated by practical considerations of granule removal and electrical insulation. Although in the electrode arrangement of FIG. 2, the high voltage and grounded electrodes form the outer granule-retaining walls of the electrified bed, other arrangements are possible. For example, the outer retaining walls of the bed may both be grounded louvered plates, and a perforated high voltage electrode may be provided in the bed centrally between these walls.

Figure 4:
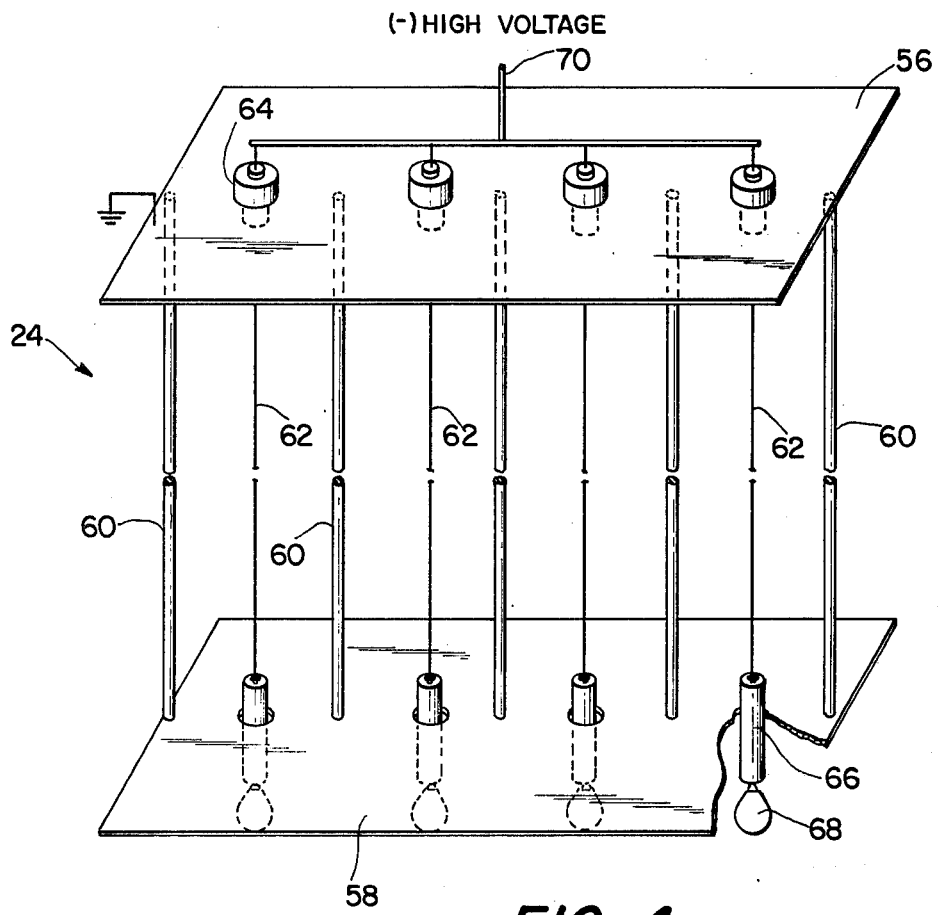
FIG. 4 is a perspective view illustrating an electrical charger which may be employed in the invention.

A suitable electrical charger 24 is shown in greater detail in FIG. 4. The charger may comprise top and bottom grounded steel plates 56 and 58 connected by half-inch aluminum bars 60. A 0.010 inch stainless steel corona wire 62 is provided between each pair of bars 60 (separated from each adjacent bar by 1", for example). The wires extend through and between the plates 56 and 58, the upper end of each wire being suspended from plate 56 via a Teflon insulating bushing 64 supported in a corresponding hole in plate 56. The lower end of each corona wire 62 is provided with a ceramic insulator 66 positioned freely within a corresponding hole in plate 58. A ten-ounce weight 68 connected to the lower end of each corona wire keeps the corona wire stable under tension. The upper end of each wire is connected to a high voltage lead 70 (preferably DC, although AC may be used). Ions produced near the corona emitting wires are carried to the grounded bars, creating particulate charging regions therebetween. Particulate entrained in the gas stream passes through these regions and is electrically charged. The term "particulate" is intended to embrace both liquid and solid substances.

Figure 5:
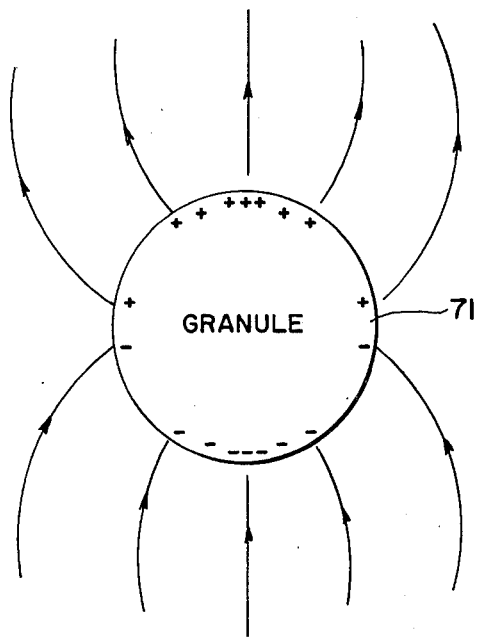
FIG. 5 is a diagrammatic view showing the manner in which the filter bed granules are electrified.

The electric field formed by the large potential difference between the high voltage electrode 32 and the grounded electrode 34 permeates the bed and effectively polarizes the bed granules, producing caps of positive and negative charges on each granule, as shown diagrammatically for granule 71 in FIG. 5. These charge caps then act as collection sites for previously charged pollutant particulate.

In accordance with the preferred embodiment of the invention, the prefilter 22 is constructed in the same manner as filter 20, and the same reference numerals have been employed in FIG. 2 to designate the parts of the prefilter 22 and the associated apparatus. The prefilter bed acts principally as a mechanical collector of "varnishing" components, however, as later described, and may or may not be electrified. Electrification enhances the collection because some fraction of the incident fume particulate may be charged and some may receive charge from stray corona resulting from the electrification of the bed. In the preferred embodiment, the prefilter bed is electrified. The main or final filter bed 20 must be electrified to achieve the very high collection efficiencies required by the invention.

In operation, the granules of the filter beds become coated with collected fume particulate. When the desired amount of coating has taken place, the spent bed granules are removed, and fresh granules are introduced. During this replenishment of the filter medium, a damper 72 in outlet 28 is operated by an actuator 74 to close the gas outlet, thus stopping gas flow through the system. Simultaneously, actuators 76 open doors 40 (which may be hinged flaps) so that the bed granules fall from the beds under the action of gravity. Restraining lips 78 maintain the removal at a controlled rate and prevent lodgement of the granules in the door hinges or flexible stops, which might cause jamming of the dumping system. When the desired amount of granules has been removed, the actuators close the doors 40 against the flexible stops 42, and the flow of granules is stopped. Damper 72 then opens the gas outlet.

Pollutant-coated granules removed from the filter beds are transferred (by a conventional conveyor) to a granule applicator of the roofing processor 18 (FIG. 1), where they are then sprinkled upon or otherwise applied to the saturated fabric and are thus employed in the manufacture of roofing material. Only part of the granules required in the roofing manufacture will usually be supplied from the filter system, other granules also being supplied to the manufacturing process as indicated in FIG. 1. Simultaneously with the removal of granules from the filter beds, fresh granules are added to the filter beds from hoppers 38, which may be re-filled from a granule supply (again, by means of a conventional conveyor). The frequency of granule removal is determined by the amount of coating desired on the granules, as dictated by the use of the granules in the roofing manufacturing process. The maximum amount of oil coating is normally limited to about 10% of the mass of the granules by the difficulty in removing heavily oiled granules from the bed. Although the granule removal and replenishment operations may be controlled manually, it is preferred to employ a conventional automatic control system 80 to control the performance of the desired operations automatically on a periodic basis.

It can be shown that, for the particulate size range of 0.1 micron to 1 micron, electrically dominated particulate collection is characterized by the following equation:

$$\eta = 1 - \exp[-\frac{3\pi}{8} c \frac{bE}{U} \frac{l_o}{R}] \qquad (1)$$

where
$\eta$ is the collection efficiency,
c is a numerical constant usually equal to 1,
b is the electrical mobility of the particulate,
E is the imposed electric field strength,
$l_o$ is the bed depth,
U is the bed face velocity, and
R is the bed particulate radius.

Below this range, particle diffusion becomes a dominant mechanism, and above this range, particle inertial impaction dominates.

In actual tests run on an electrified bed system in accordance with the invention, at a shingle manufacturing plant producing asphaltic fumes with particulate of geometric mean diameter of 1.6 microns and geometric standard deviation of 1.4, it was found that the size distribution of the fumes passing through the prefilter bed was entirely submicron. Samples of the inlet fumes precipitated onto metal plates for experimental purposes produced characteristic "varnishing," while samples of the fumes after the prefilter showed no such varnishing. The varnishing components were therefore proved to be in the 1 micron and greater size range. This is consistent with the hypothesis that the varnishing fume components are the heavier molecular weight more tarry asphalt fractions which are most likely formed by the direct spraying or agitation of the asphalt. These heavier molecular weight species are less volatile and therefore tend to condense sooner and grow to supermicron size. The submicron components of the fumes are the lighter asphalt fractions that are largely generated by boiling the asphalt. The varnishing components were found to lie in the size range of about 1 to 5 microns, making possible a renewable granular bed prefilter with high collection efficiency by mechanical mechanisms to remove the varnishing components before they reach the charger.

Low efficiency fiber mat prefilters commonly employed in two stage electrostatic precipitators used in asphalt roofing plants serve to remove only the very large felt fibers and stone dust, but allow 1 to 5 micron sized asphalt fume particulate to pass through. Thus, such prefilters cannot protect a charger (or collecting electrodes) from the varnishing components of the fumes.

In other environments, two-stage *fluidized* bed filter systems have been employed in which the first stage is intended to reduce particulate loading of a charger between the stages. Fluidized beds are not appropriate in the present invention, however, because of their large and unwieldy size and because it would be difficult and expensive to cleanse the bed granules of fine dust to avoid "dust storms" which would be produced by blowing large amounts of air through finely powdered granules.

In prior work of some of the present co-inventors with fluidized beds for collecting dry particulates, a liquid additive was used to promote adhesion to the bed particles, and the spent bed particles were disposed of by combustion or by processing (crushing and/or sintering and crushing), certain fractions being returned to the bed and other fractions being discarded. This is to be contrasted with the present invention in which packed beds are employed for removing oily pollutants, in which a prefilter is used for removing the 1 to 5 micron varnishing components of the pollutants, and in which pollutant-coated granules are employed in a product-manufacturing process.

Figure 6:
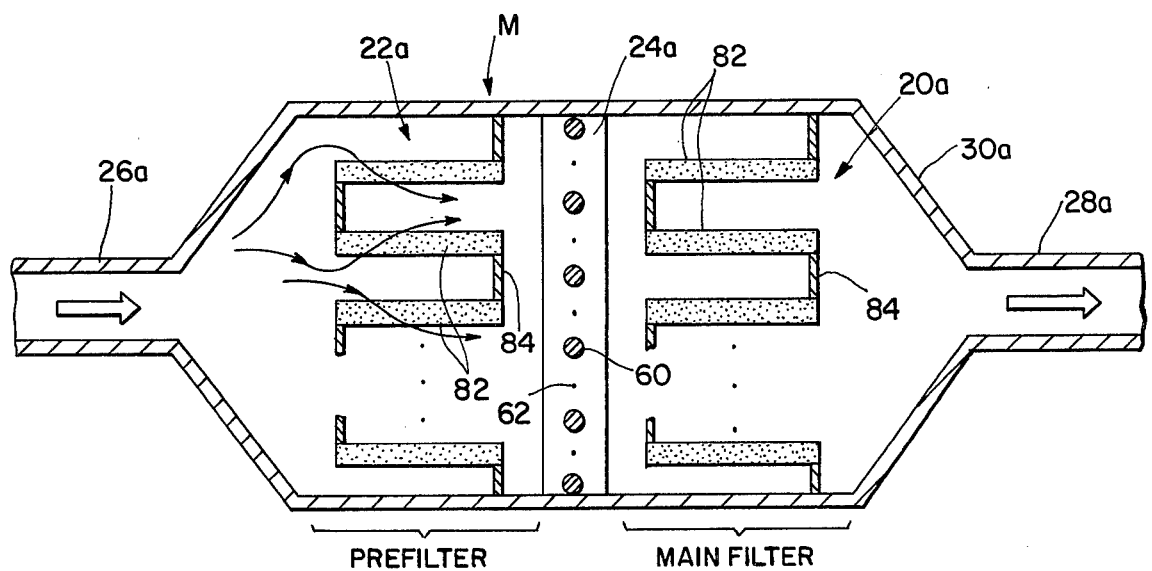
FIG. 6 is a diagrammatic horizontal sectional view illustrating a filter module in accordance with the invention.

Filter systems in accordance with the present invention may be constructed from a plurality of filter modules, each module having a main filter and a prefilter, with an intermediate charger. FIG. 6 illustrates diagrammatically a practical module embodiment in accordance with the invention, as seen in horizontal section looking downward. As shown, both the main filter 20a and the prefilter 22a are of labyrinthine or serpentine construction, both filters and the charger 24a being held in a chamber 30a which may be part of a duct having a gas inlet 26a and a gas outlet 28a. Each filter comprises a plurality of panels 82 oriented parallel to the axis of the conduit 30a and separated by gas-impervious spacers 84 (which could alternatively be filter panels also). Each panel may be constructed like the filter beds of FIG. 2, with the same electrode arrangement, hopper, door, etc. By the labyrinthine or serpentine filter arrangement shown in FIG. 6, a very large effective filter area is provided in a small space, with the inlet gas stream being divided so as to pass through the multiple filter panels. Conventional baffles may be employed to direct the gas flow, if desired.

Figure 7:
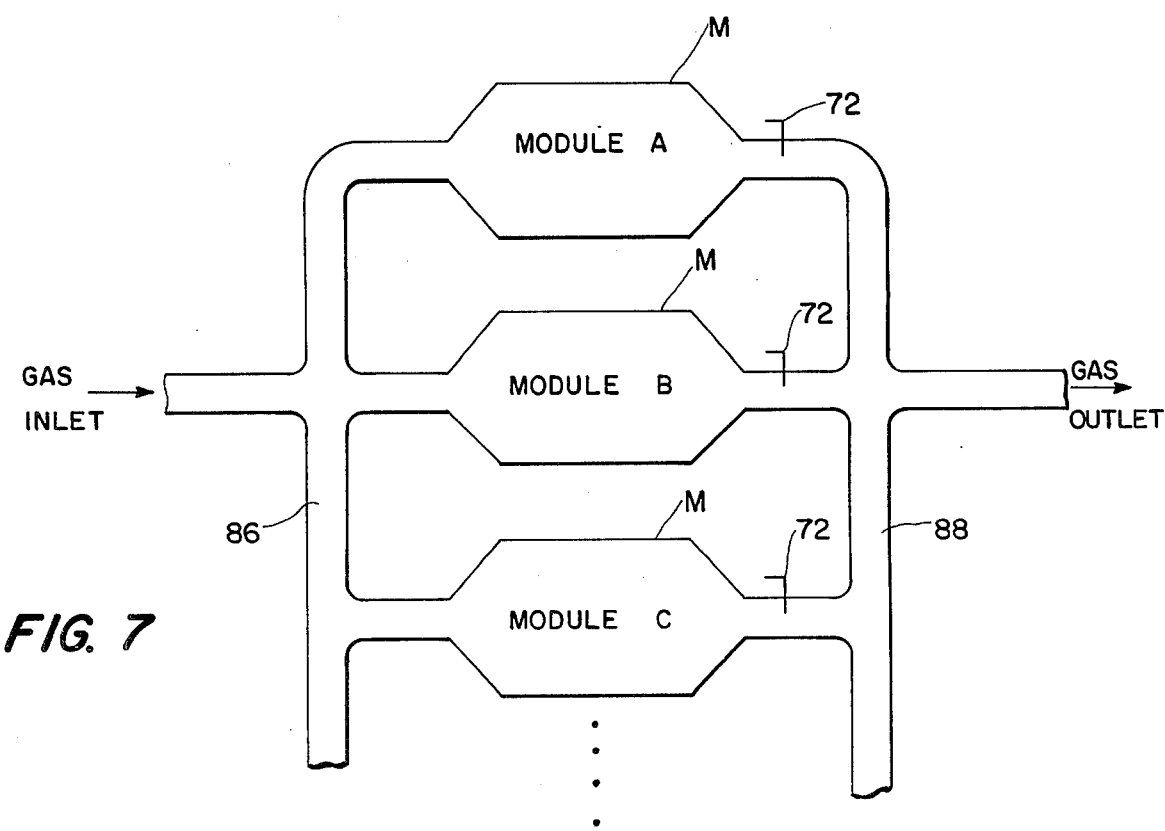
FIG. 7 is a diagrammatic view illustrating a filter system employing a plurality of modules of the invention.

FIG. 7 illustrates an arrangement comprising multiple modules M of the type shown in FIG. 6. The modules are connected to suitable gas inlet and gas outlet manifolds 86 and 88, with the gas stream divided between the modules. This parallel module configuration is preferred for effective operation during bed granule changes, since the dampers 72 may be actuated selectively, only one or only a few modules being replenished at any given time, the remaining modules continuing to function normally. The gas flow is thus not seriously interrupted. Modular design also permits shutdown of individual modules for maintenance and inspection without shutdown of the entire system.

As stated previously, the optimum bed depth has been found to be between 1 and about 3 inches. The optimum bed depth is determined by the following operational considerations.

1. Bed voltage $(V) \leq 15$ $KV$ for ease of insulation.
2. Collection efficiency $(\eta) \geq 99\%$. Using Equation 1 and by noting that $E = V/l_o$, this requires that:

$$bV/Ur \gtrsim 5. \quad (2)$$

With typical submicron particulate mobilities $$b \approx 10^7 \ m/sec/V/m,$$

$$\text{slate radius } R = 0.75 \times 10^{-3},$$

and maximum voltage $$V = 15 \times 10^3 V.$$

This constrains $$U \lesssim 0.4 \ m/sec. \quad (3)$$

3. System of reasonable size. The maximum amount of panel bed area that can be packed into a reasonable size system for a 30,000 cfm process is about 750 ft² per bed. Therefore, the minimum bed face velocity is $$U \gtrsim 0.2 \ m/sec. \quad (4)$$

4. Overall system pressure drop $(\Delta P) \leq 6''$ *wg* for low operating costs It has been experimentally found that the crushed slate beds exhibit pressure drops of about $$0.02'' wg/(1 \ fpm \ \text{face velocity} \times 1 \ \text{inch depth}). \quad (5)$$

So, the overall pressure drop for two identical beds is $$\Delta P \ 2 \times 0.02 \times U \ (fpm) \times l_o(in.). \quad (6)$$

As a typical value as constrained by considerations 2 and 3, U=0.3 m/sec=60 fpm, and the pressure drop consideration requires $$l_o \lesssim 2.5 \ \text{inches.} \quad (7)$$

5. Maximum electric field (E) strength allowable for easy insulation without breakdown is $E \leq 5 \times 10^5$ V/m. If V = 15 KV, this requires:

$$l_o \gtrsim 1.2 \ \text{inches.}$$

These practical design criteria then specify that $$1 \ \text{inch} \lesssim l_o \lesssim 3 \ \text{inches}$$

$$0.2 \ m/sec \lesssim U \lesssim 0.4 \ m/sec.$$

It is apparent that the invention provides an apparatus and method which not only solve the problem of noxious and troublesome emissions from asphaltic roofing manufacturing operations and the like, but that actually enhance the production of the desired product. The invention has high collection efficiency and low power requirements. The effective cost of the bed material is zero, because the granules of the bed are employed in the manufacturing process. In addition, pre-oiling of the granules which occurs during the filtering improves the retention of the granules in the roofing material and recovers valuable oil that would otherwise be lost. While preferred embodiments of the invention have been shown and described, it will be apparent to those skilled in the art that changes can be made without departing from the principles and spirit of the invention, the scope of which is defined in the appended claims.

What is claimed is:

1. For use in a system for manufacturing asphaltic roofing in which granules are applied to asphalt-treated fabric by a granule applicator, apparatus for controlling emission of particulate pollutants produced in manufacturing the roofing and comprising at least one electrified packed bed filter means including a bed of grandules of the type employed in manufacturing the roofing and electrode means for electrifying the granules of the bed, means for passing a gas stream containing the pollutants through the electrified bed, means for electrically charging the pollutants in the gas stream before the gas stream is passed through the bed, means for removing pollutant-coated granules from the bed, and means for transferring the removed granules to said applicator for application to the treated fabric.

2. Apparatus in accordance with claim 1, wherein the bed comprises a vertical panel, and the means for removing pollutant-coated granules from the bed comprises a door at the bottom of the bed which is opened to allow the granules to flow from the bed by gravity.

3. Apparatus in accordance with claim 1, further comprising prefilter means for removing, prior to the electrical charging of the pollutants, the varnishing components of said pollutants which are in the 1–5 micron size range.

4. Apparatus in accordance with claim 3, wherein said prefilter means comprises a packed bed filter including a bed of granules of the type employed in manufacturing the roofing, means for removing pollutant-coated granules from the last-mentioned bed and means for transferring the last-mentioned removed granules to said applicator for application to the treated fabric.

5. Apparatus in accordance with claim 4, wherein the bed of said prefilter means comprises a vertical panel, and the means for removing pollutant-coated granules from the bed of the prefilter means comprises a door at the bottom of that bed which is opened to allow the granules to flow therefrom by gravity.

6. Apparatus in accordance with claim 4, wherein each bed comprises a plurality of bed panels arranged in labyrinthine configuration.

7. Apparatus in accordance with claim 6, there being a plurality of filter means and prefilter means, each filter means having a prefilter means associated therewith and forming a module, and the modules being arranged in parallel with said gas stream being divided therebetween.

8. Apparatus in accordance with claim 4, wherein the depth of the beds is in the range from about 1 to about 3 inches.

9. Apparatus in accordance with claim 1, wherein the depth of the bed is in the range from about 1 to about 3 inches.

10. Apparatus in accordance with claim 1, wherein at least one of the electrode means serves to retain the granules in the bed and comprises a louvered plate, the louvers extending outwardly and upwardly from the bed and having associated slots by which the gas stream enters the bed, the extent of the louvers being sufficient to retain the granules in the bed.

11. Apparatus in accordance with claim 1, wherein the granules comprise crushed slate.

12. For use in a system for manufacturing asphaltic roofing in which granules are applied to an asphalt-treated fabric by a granule applicator, a filter system for controlling emission of particulate pollutants produced in manufacturing the roofing and comprising prefilter means including a bed of granules of the type employed in manufacturing the roofing for removing pollutants in the 1 to 5 micron size range, means for passing through the prefilter means a gas stream containing the pollutants, means for electrically charging the pollutants remaining in the gas stream from the prefilter means, electrified bed filter means, means for passing the gas stream containing the charged pollutants through the filter means, whereby the charged pollutants are removed from the gas stream, means for removing pollutant-coated granules from the prefilter means, and means for transferring the removed granules to the applicator for application to the treated fabric.

13. Apparatus in accordance with claim 12, wherein the bed of the prefilter means comprises a vertical panel, and the means for removing pollutant-coated granules from the prefilter means comprises a door at the bottom of the bed of the prefilter means which is opened to allow the granules to flow therefrom by gravity.

14. Apparatus in accordance with claim 12, wherein the prefilter means comprises an electrified bed of granules.

15. Apparatus in accordance with claim 12, wherein the filter means comprises an electrified bed of granules of the type employed in manufacturing said roofing, means for removing pollutant-coated granules from the filter means, and means for transferring the last-mentioned removed granules to the applicator for application to the treated fabric.

16. Apparatus in accordance with claim 15, wherein the bed of the filter means comprises a vertical panel, and the means for removing pollutant-coated granules from the filter means comprises a door at the bottom of the bed of the filter means which is opened to allow the granules to flow therefrom by gravity.

17. Apparatus in accordance with claim 15, wherein the granules comprise crushed slate.

18. In a product manufacturing process in which liquid-coated granules are applied to a substrate and in which fumes are produced from the liquid, a method of controlling fume emissions and enhancing the manufacturing process which comprises forming a gas stream containing the fumes, electrically charging the fumes in the gas stream, passing the gas stream with the electrically charged fumes through an electrified bed of granules of the type employed in the manufacturing process, whereby the fumes coat the granules with a liquid coating, and removing the coated granules from the bed and applying the same to the substrate in the manufacturing process.

19. A method in accordance with claim 18, wherein, prior to said charging, varnishing components of the fumes in the 1–5 micro size range are removed from the gas stream by prefiltration.

20. A method in accordance with claim 19, wherein the prefiltration comprises passing the gas stream through a bed of granules of the type employed in the manufacturing process and wherein those granules when coated with the varnishing components, are removed from their bed and applied to the substrate in the manufacturing process.

21. A method in accordance with claim 20, wherein the beds are arranged as vertical panels and the coated granules are removed from the beds by opening a door at the bottom of the panels and permitting the granules to flow from the beds by gravity.

* * * * *